(12) United States Patent
Hecht et al.

(10) Patent No.: US 10,109,070 B1
(45) Date of Patent: Oct. 23, 2018

(54) METHODS AND SYSTEMS FOR MOTION COMPENSATION AND STEREOSCOPIC IMAGES GENERATION

(71) Applicant: THE AEROSPACE CORPORATION, El Segundo, CA (US)

(72) Inventors: James H. Hecht, Hermosa Beach, CA (US); David W. Warren, Los Angeles, CA (US); David J. Gutierrez, Long Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 15/704,376

(22) Filed: Sep. 14, 2017

(51) Int. Cl.
| | |
|---|---|
| *G06T 1/00* | (2006.01) |
| *H04N 5/33* | (2006.01) |
| *G06T 7/593* | (2017.01) |
| *G06T 7/579* | (2017.01) |
| *G06T 7/20* | (2017.01) |

(52) U.S. Cl.
CPC ............ *G06T 7/593* (2017.01); *G06T 1/0007* (2013.01); *G06T 7/20* (2013.01); *G06T 7/579* (2017.01); *H04N 5/33* (2013.01); *G06T 2207/10012* (2013.01); *G06T 2207/20201* (2013.01)

(58) Field of Classification Search
CPC ...................................................... G06T 7/593
USPC ....................................................... 348/208.11
See application file for complete search history.

(56) References Cited

U.S. PATENT DOCUMENTS

2012/0093361 A1* 4/2012 Huang .................... G06T 7/277
382/103

* cited by examiner

*Primary Examiner* — Joel Fosselman
(74) *Attorney, Agent, or Firm* — One LLP; Young A. Tang

(57) ABSTRACT

An image acquisition system with motion compensation is disclosed. Embodiments of the system include: includes a rectilinear lens assembly, a first 2D-image sensor, and a motion compensation module. The rectilinear lens assembly has an optical axis, an object plane, and a focal plane. During an image acquisition cycle, the rectilinear lens assembly is positioned such that the optical axis is orthogonal to the object plane while the first 2D-image sensor is parallel to the object plane. The motion compensation module can determine a motion vector of an image scene in the object plane. In response the determined motion vector, the rectilinear lens assembly and the first 2D-image sensor relative are translated relative to each other in two dimensions to compensate for the motion of the image scene.

20 Claims, 14 Drawing Sheets

2 FPAs in Camera
Continuous coverage
40 degree stereo angle

METHODS AND SYSTEMS FOR MOTION COMPENSATION AND STEREOSCOPIC IMAGES GENERATION

FIELD OF THE INVENTION

Various aspects of the disclosure relate to an imaging system with motion compensation features, some aspects of the disclosure relate to an imaging system with motion compensation and stereoscopic features.

BACKGROUND

Blurred or smeared images occur when there is relative motion between objects in the image scene and the image sensor (e.g., film). This occurs when light from objects in the scene to be imaged is transposed over many pixels of the image sensor. This is referred to as pixel smearing. A common example of pixel smearing is an image of a fast moving object or scene taken with an average or long exposure time. Alternatively, pixel smearing can occur when the object is stationary, but the camera is moving at a fast rate of velocity. This a common problem in aerial surveying photography where images are taken from a moving platform such as a plane, a satellite, or the international space station (ISS).

In an example of the ISS, a camera on board of the ISS is moving at about 7.4 km/sec with respect to the Earth. In low light conditions, the exposure time can be one second or longer. During the one second exposure, given that a single pixel of an image sensor projects to approximately 70 meters on the ground, each pixel will integrate light (photons) from a 7.4 km long strip. Understandably, this causes intense pixel smearing and blurred images.

One way to reduce smear is to apply forward motion compensation (FMC). This approach has long been applied to film based aerial surveying cameras where the film is moved through the focal or image plane at a rate such that a spot on the film is always seeing the same spot on the ground. However, the film-based FMC approach has several shortfalls. First, it only compensates for one degree of motion. Secondly, the use of a shutter is required to stop the film exposure. This limits the ability to make a number of consecutive image frames. Finally, film is limited in spectral sensitivity and the resultant images are difficult to process and transmit in real time from an orbiting platform.

Another conventional approach to FMC is to use electronic sensors such as charge coupled device (CCD) sensors. One such approach uses a time delay integration (TDI) CCD sensor where photoelectric charges generated in row of pixels (perpendicular to the direction of motion) are electronically transferred to a readout integrated circuit at a rate such that the signal from a discrete position on the ground continues to be integrated during an exposure. The TDI-CCD approach is intended primarily to compensate for low signal conditions in pushbroom imaging. However, TDI-CCD sensors also have several shortfalls. First, it does not address the distortion effects inherent in pushbroom imaging systems which use wide-angle lenses. Further, to compensate for motion during a long exposure (e.g., one second or longer), a continuous 2D push broom image cannot be obtained as many pixels (e.g., hundreds) in a row are integrated to generate a single signal. Finally, CCD sensors are restricted to a certain spectrum and are not sensitive to infrared wavelengths. Accordingly, an improved FMC system is needed for an infrared-based imaging system.

SUMMARY OF THE INVENTION

Disclosed herein is an imaging system with motion compensation. The imaging system includes a rectilinear lens assembly, a first 2D-image sensor, and a motion compensation module. The rectilinear lens assembly has an optical axis, an object plane, and a focal plane. During an image acquisition cycle, the rectilinear lens assembly is positioned such that the optical axis is orthogonal to the object plane. In a space-based imaging platform, the optical axis can be pointed at nadir. The first 2D-image sensor is located in the focal plane and is parallel to the object plane. The motion compensation module can determine a motion vector of an image scene in the object plane. In response to the determined motion vector, the motion compensation module can translate the rectilinear lens assembly and the first 2D-image sensor relative to each other in two dimensions to compensate for the motion of the image scene. In this case, the forward motion of the ISS and the rotation of the Earth.

In some embodiments, during an image acquisition cycle, the relative motion of the rectilinear lens assembly and the first 2D-image sensor can cause the first 2D-image sensor to be partially or fully offset from the optical axis. At the start of an image acquisition cycle, the first 2D-image sensor can be positioned within an image circle of the rectilinear lens assembly such that it is entirely offset from the optical axis. In this way, the first 2D-image sensor can be closer to the image scene to be imaged. Alternatively, the first 2D-image sensor can be centered in the center of the image circle. The relative motion of the rectilinear lens assembly and the first 2D-image sensor can be generated by: moving the rectilinear lens assembly while fixing the first 2D-image sensor in place, or by moving the first 2D-image sensor and fixing the rectilinear lens assembly in place, or by moving both the rectilinear lens assembly and the first 2D-image sensor simultaneously.

In some embodiments, the imaging system further includes a second 2D-image sensor located on the focal plane near the first 2D-image sensor. The second 2D-image sensor is also parallel to the object plane and is configured to be exposed after the first 2D-image sensor. Images generated from the first and second 2D-image sensors can form a stereoscopic image pair. Each of the first and second 2D-image sensors can be an infrared or near-infrared focal plane array.

In some embodiments, the second 2D-image sensor can include an integrated aperture for each detector unit/pixel of the second 2D-image sensor. The integrated aperture is configured to expose the second 2D-image sensor to electromagnetic radiation after the first 2D-image sensor is exposed. At the start of each image acquisition cycle, both the first and second 2D-image sensors are inside of the image circle of the rectilinear lens assembly.

In some embodiments, the second 2D-image sensor is located on the image plane near the first 2D-image sensor and parallel to the object plane. Both the first and second 2D-image sensors are pointed to the same area on the object plane at different times. Specifically, in this embodiment, the second 2D-image sensor is exposed at a later time from a different angle due to motion of the moving platform. Since the images from the first and second image sensors are translated in position and in angle with respect to each other, they can form a stereoscopic image pair.

In some embodiments, a stereoscopic image pair can also be generated using images captured from a single image sensor, but in different frames or image acquisition cycle. In this embodiment, a stereoscopic image pair can be generated using a first and a second images generated, by a single image sensor, during a first and second image acquisition cycles, respectively.

Also disclosed is a method for motion compensation in an image acquisition system. Embodiments of the method include: positioning a rectilinear lens assembly such that an optical axis of the rectilinear lens assembly is at nadir; and positioning a first 2D-image sensor on a focal plane of the rectilinear lens assembly and parallel to the object plane. The first 2D-image sensor can be positioned such that a center of the first 2D-image sensor is off nadir. The method further includes determining a motion vector of the image scene in the object plane; and translating, in two dimensions on the focal plane, the rectilinear lens assembly and the first 2D-image sensor with respect to each other based on the determined motion vector of the image scene.

Embodiments of the method further include: positioning a second 2D-image sensor on the focal plane near the first 2D-image sensor and parallel to the object plane; exposing the second 2D-image sensor to electromagnetic radiation after exposing the first 2D-image sensor; and creating a stereoscopic image pair from images generated by the first and second 2D-image sensors.

Embodiments of the method further include: positioning the first 2D-image sensor near the edge of an image circle of the rectilinear lens assembly and the second 2D-image sensor outside of the image circle at the start of an image acquisition cycle; and exposing the second 2D-image sensor when it is moved into the image circle of the rectilinear lens assembly during the image acquisition cycle.

Embodiments of the method further include: positioning the first and second 2D-image sensors within an image circle of the rectilinear lens assembly at a start of an image acquisition cycle; positioning the second 2D-image sensor parallel to the object plane; and exposing the second 2D-image sensor, using an integrated aperture on the second 2D-image sensor, after the first 2D-image sensor is exposed.

Also disclosed is a method for motion compensation in an image acquisition system. Embodiments of the method include: positioning an optical axis of a rectilinear lens assembly at nadir; and positioning an image sensor on a focal plane of the rectilinear lens assembly and parallel to the object plane. In some embodiments, the image sensor is positioned such that a center of the image sensor is at nadir. The method further includes determining a motion vector of the image scene in the object plane; and translating the rectilinear lens assembly and the first 2D-image sensor with respect to each other, in two dimensions of the focal plane, based on the determined motion vector of the image scene.

BRIEF DESCRIPTION OF THE DRAWINGS

The foregoing summary, as well as the following detailed description, is better understood when read in conjunction with the accompanying drawings. The accompanying drawings, which are incorporated herein and form part of the specification, illustrate a plurality of embodiments and, together with the description, further serve to explain the principles involved and to enable a person skilled in the relevant art(s) to make and use the disclosed technologies.

DETAILED DESCRIPTION

Overview

Figure 1:
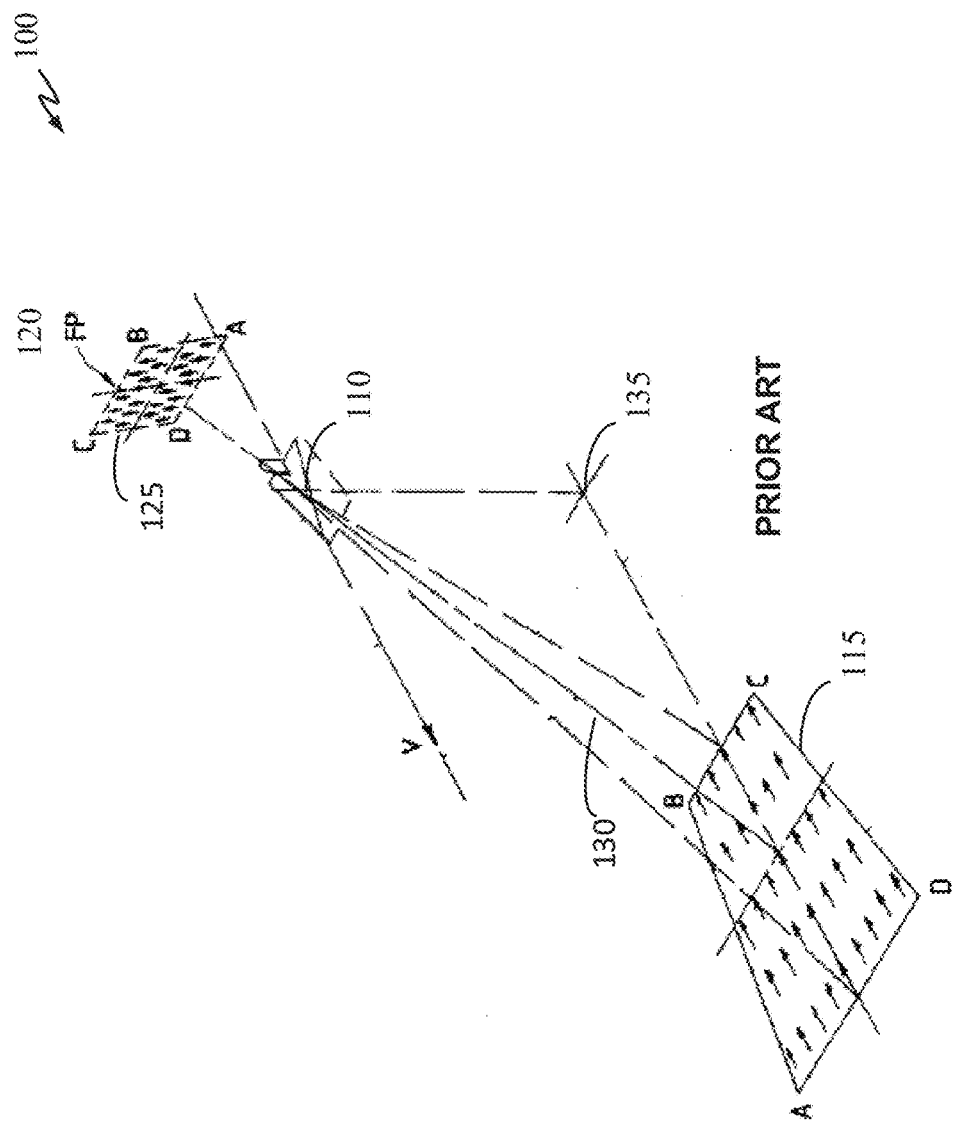
FIG. 1 illustrates a conventional imaging system.

To better illustrate the novel and improved FMC imaging system described herein, a brief discussion of the prior arts and the environment in which they operate may be beneficial. FIG. 1 illustrates a conventional imaging system 100 for capturing ground images from a high attitude and a high velocity moving platform. For example, imaging system 100 can be mounted on a fast moving plane or a space-based platform (e.g., a satellite or the ISS) moving at orbital speeds. Imaging system 100 includes a lens assembly 110 and an image sensor 125. Lens assembly 110 has an object plane 115, a focal plane 120, and an optical axis 130. Lens assembly 110 is typically a wide angle lens, which is commonly used in aerial surveying imaging systems because its large field of view.

Imaging of the earth's surface from a space-based platform moving at orbital speeds will be affected by pixel smearing due to the differential motion of the camera and the image scene at the object plane. This is particularly pronounced when the combination of the exposure time and the velocity of the moving platform is appreciably larger than the projected dimension of a pixel of the image sensor (e.g., image sensor 125). The standard technique to compensate for the forward motion of the platform and to mitigate the effect of pixel smearing does so by fixing the center pixel of the image sensor at the same spot on the ground during an exposure. Current technologies accomplish this feat by either rotating the camera mechanically (lens assembly 110) or moving the rows of pixels of the image sensor electronically or mechanically. However, if the object plane (assuming a locally flat Earth) is not parallel to the focal plane of the imaging system, motion compensation cannot be performed for long integration times without incurring large amounts of smear. In other words, if the imaging system is tilted such that its optical axis is not pointed at nadir, image distortion can occur even with the application of current FMC technologies.

For example, imaging system 100 still suffers from high pixel smearing even though it can employ several conventional FMC approaches (e.g, rotating mirror, one-dimensional film translation, and TDI) to compensate for the motion of the imaging platform. This shortfall is, in part, attributed to the railroad track effect (i.e., keystone distortion). As illustrated in FIG. 1, optical axis 130 of lens assembly 110 is positioned at an angle away from nadir (point 135), rather than being orthogonal to it. Focal plane 120 of lens assembly 110 is axially aligned with optical axis 130. In other words, image sensor 125, which is on focal plane 120, is at an angle (not parallel) with respect to object plane 115. Since optical axis 130 is not pointed at nadir 135, image distortion and rotation will occur because straight and parallel lines on focal plane 120 are not directly mapped to straight and parallel lines on object plane 115. Accordingly, even with the application of conventional FMC technologies, it is not possible to keep each of the pixels of image sensor 125 fixed on a given spot at object plane 115 during the exposure. As a result, the final image will have pixel smearing.

As mentioned, system 100 can employ several conventional FMC approaches. They are the mechanical film translation, the rotating mirror, the time delay integration using CCD sensor approaches. In the mechanical film translation approach, the film can be translated in one dimension to counteract the motion of the platform (e.g., aircraft, satellite) and the image at the object plane. Image sensor 125 can be translated at a velocity equivalent to the image velocity but in the opposite direction of the moving platform. In this way, the image is effectively motionless with respect to image sensor 125. However, pixels at the edge of image sensor 125 will still experience a substantial amount of smear due to the inherent distortion created by the wide angle lens and by the angle at which image sensor 125 is located with respect to object plane 115. For space-based platforms, the problem is further exacerbated by the rotation of the Earth.

The rotating mirror technique, as the name suggests, employs a rotating mirror to redirect the image scene at object plane 115 from lens assembly 110 to image sensor 125 such that the image scene appear to be motionless. The mirror-rotation technique also suffers the same shortfalls as mechanical film translation approach where pixel smearing at the edge is still substantial. Notably, the rotating mirror technique cannot fix the distortion created by the Earth's rotation and misalignment between the object plane and the focal plane (where the image sensor is situated).

As previously mentioned, using a time delay integration CCD sensor is another approach to FMC. In this approach, photoelectric charges in a row of pixels perpendicular to the direction of motion are integrated and readout as a single signal during the length of the exposure. However, due to the long integration period, a continuous image over each individual pixel in a row of pixels cannot be obtained since all pixels in a single row are integrated over time.

Another drawback using time delay integration CCD sensors is that they are not sensitive to some infrared wavelengths (particularly wavelengths above 1100 nm), which is particularly useful in certain situations such as in severe cloudy conditions or night time imaging. In these situations, an imaging system using an infrared or long-wavelength infrared focal plane array (FPA) can be preferable over a CCD-based system as infrared FPAs are made of materials sensitive to the infrared spectrum. In the context of this discussion an FPA refers to any 2D focal plane array including CCDs.

Figures 2A, 2B:
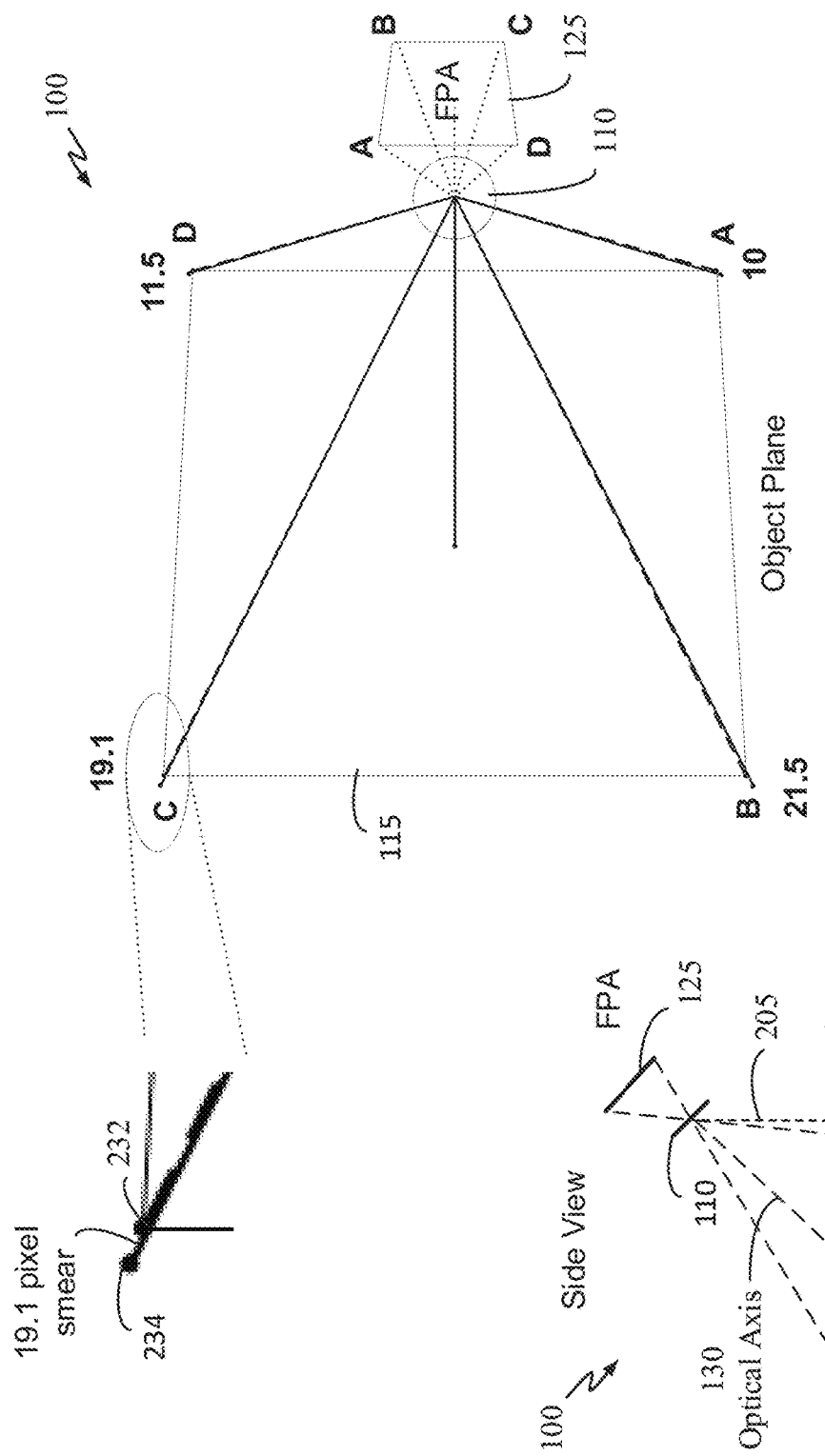
FIG. 2A is a top view illustrating a conventional arrangement of a lens assembly and an image sensor, and the smear effect on the image plane of the conventional imaging system.
FIG. 2B is a side view illustrating the conventional arrangement of the lens assembly and the image sensor.

FIGS. 2A and 2B illustrate a top view and a side view of the lens and sensor arrangement of system 100, respectively. Both FIGS. 2A and 2B will be discussed concurrently. System 100 is an imaging system with FPA 125. System 100 employs a conventional a FMC technology such as rotating mirror to compensate for the forward motion of the imaging platform (e.g., the ISS). As shown in FIG. 2B, optical axis 130 of system 100 is at an angle with respect to a true vertical line 205, which is pointed at nadir 135. FPA 125 is perpendicular to the optical axis of lens assembly 110 and at an angle with respect to object plane 115.

FIG. 2A illustrates the effects of distortion and motion caused by the spatial arrangement of FPA 125 and object plane 115 and by the one-dimensional motion compensation technique employed by system 100. FMC only compensates for the forward orbital motion, a single direction, of the imaging platform. It does not account for the rotation of the Earth. As a result, pixel smearing is created, particularly at the edge of image sensor 125. As alluded to, the spatial arrangement of FPA 125 and object plane 115 also causes additionally pixel smearing because FPA 125 is at an angle with respect object plane 115. This causes image distortion due to an optical perspective phenomenon that can be referred to as the railroad tracks effect or keystone distortion.

Figure 2C:
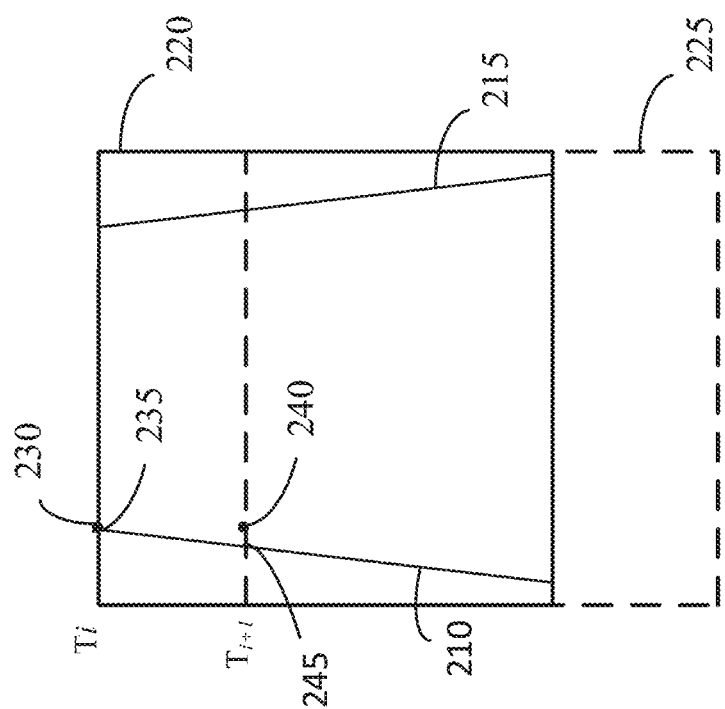
FIG. 2C is a block diagram illustrating the optical distortion inherent in conventional imaging systems.

FIG. 2C is an illustration of the smear caused by the railroad track effect where parallel features in object plane 115 do not map to parallel pixels in FPA 125. In FIG. 2C, lines 210 and 215 are parallel in object plane 115. However, in focal/image plane 120, parallel lines 210 and 215 appear to converge at a distant point on focal plane 120. During a long exposure, this effect causes pixel smearing. For example, during an exposure from $T_i$ to $T_{i+1}$, electromagnetic radiation is collected at an initial image frame 220 at $T_i$. At $T_{i+1}$, electromagnetic radiation is collected at a subsequent frame 225, which has translated by a certain distance. In the initial frame 220, a pixel 230 of FPA 125 maps to a distal point 235 of line 210. In subsequent frame 225, the same distal point 235 of line 210 has moved and now maps to a pixel 240 on FPA 125. However, the true location of distal point 235 is at location 245. The spatial difference between points 240 and 245 causes pixel smearing and/or distortion.

Referring again to FIG. 2A, even with FMC, system 100 has a lot of smear and distortion at the edge of FPA 125. For example, point 232 at corner C represents a pixel in FPA 125 being mapped (by the dashed line) to a location as shown in object plane 115 right after at the initial exposure at time $t_0$. At time $t_0+1$, the same location in object plane 115 is now mapped (represented by the solid line) to pixel 234 in FPA 125. In system 100, the pixel distance between points 232 and 234 is 19.1 pixels. In an ideal motion compensation system, this number should be zero. Corners A, B, and D of FPA 125 also have a considerable amount of smear. The amount of measured pixel smears is 10, 21.5, and 11.5 pixels for corners A, B, and D, respectively.

Rectilinear Lens-Based Motion Compensation System

Figure 3:
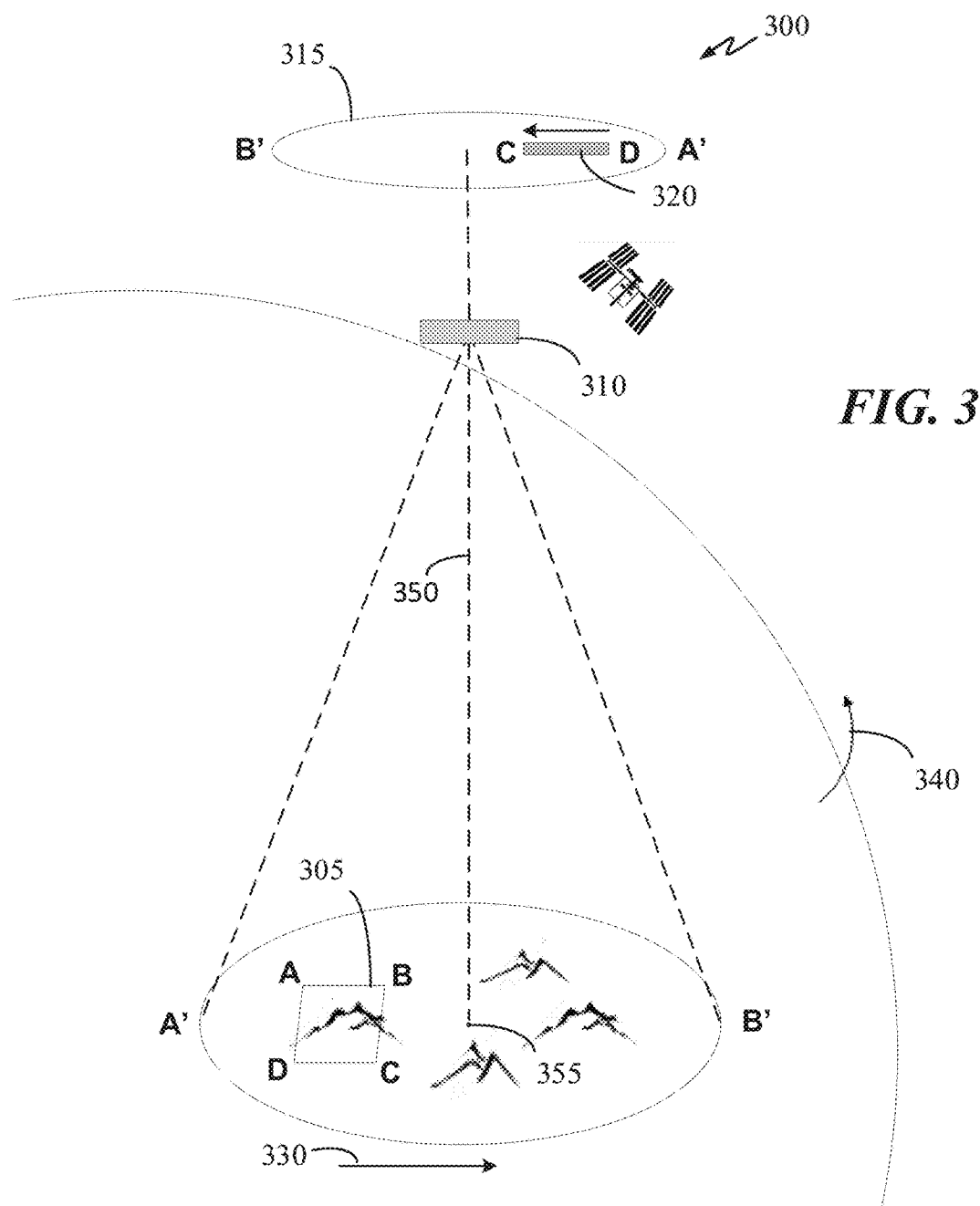
FIG. 3 illustrates an example environment in which an improved imaging system operates in accordance with some embodiments of the present disclosure.

FIG. 3 illustrates an environment in which imaging system 300 operates in accordance with some embodiment of the present disclosure. In some embodiments, imaging system 300 can employ a two-dimension motion (x and y directions) compensation technique that uses a rectilinear lens assembly and an image sensor/FPA being parallel to the object plane of the rectilinear lens assembly. Imaging system 300 can be mounted on an orbital platform such as a satellite or the ISS. Imaging system 300 includes a field of view 305, a rectilinear lens assembly 310, an image circle 315, a FPA sensor 320 (or simply FPA), and a motion compensation module (see FIG. 9). Field of view 305 can be a 20°×20° forward looking rectangle within a ground swatch of 140 km×140 km. The resolution of FPA sensor 320 is approximately 70 meters. In other words, each pixel of FPA 320 is mapped to a 70m×70m area on the ground. FPA 320 can have a detection area of 2048×2048 pixels. It should be noted that where a discrete value or range of values is set forth, it is noted that the value or range of values may be claimed more broadly than as a discrete number or range of numbers, unless indicated otherwise. Any discrete values mentioned herein are merely provided as examples.

Rectilinear lens assembly 310 is designed and fabricated such that image circle 315 is larger than FPA 320. One of many ways to change the size of image circle 315 is to adjust the focal length of rectilinear lens assembly 310. In some embodiments, image circle 315 can be at least 1.5 larger than the size of FPA 320. In one embodiment, image circle 315 is sized such that at least two full FPAs 320 can fit within image circle 315. In this way, during the motion compensation process, there is ample room to create relative motion between FPA 320 and image circle 315 such that FPA 320 can be moved to various locations within image circle 315 (i.e., any quadrant of image circle 315). In some embodiments, FPA 320 can be translated to create the relative motion while fixing rectilinear lens assembly 310 in place. Alternatively, rectilinear lens assembly 310 can be translated with respect to FPA 320 to create relative motion between FPA 320 and lens assembly 310 (including image circle 315). Still further, both rectilinear lens assembly 310 and FPA 320 can be translated to create the relative motion.

Figures 5A, 5B:
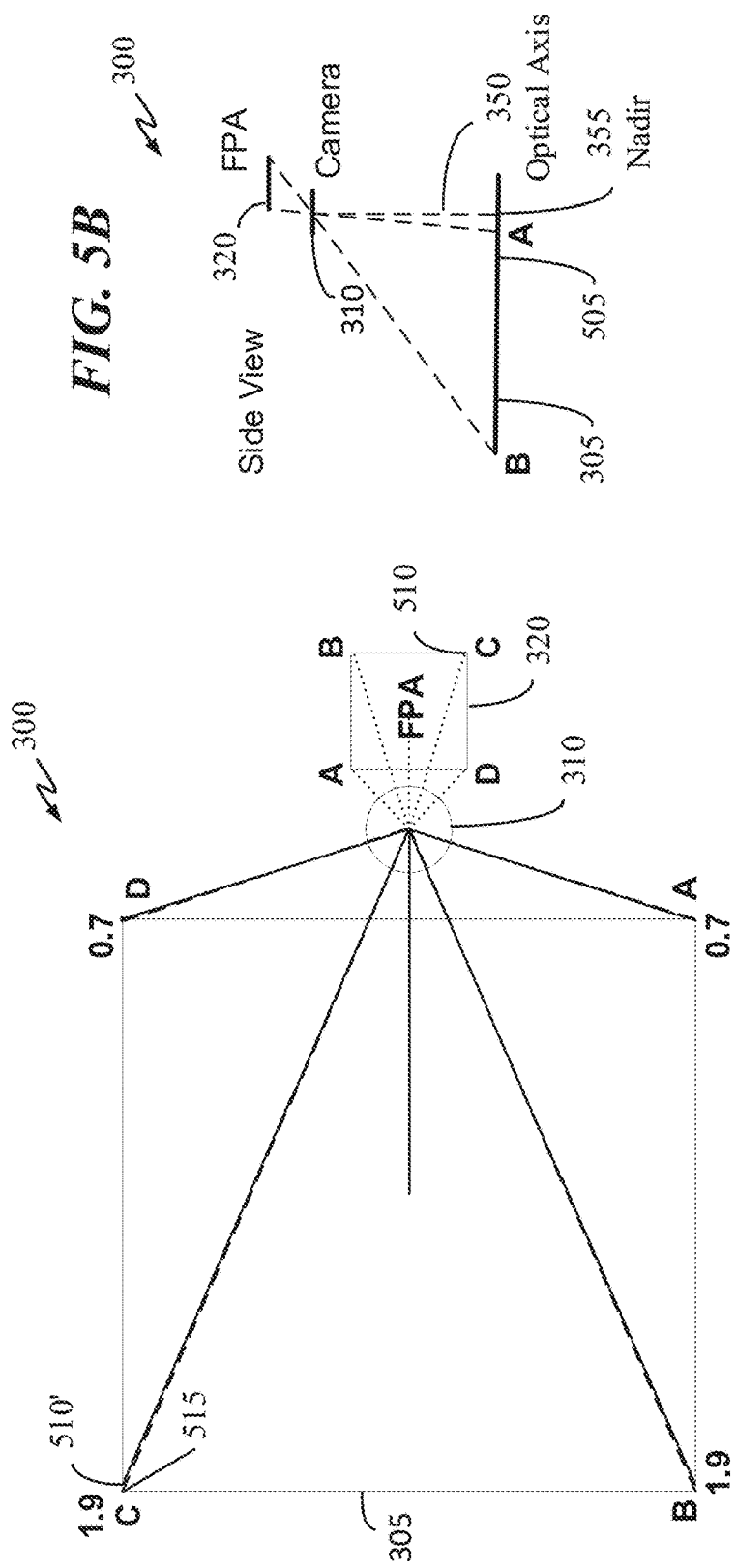
FIG. 5A is a top view illustrating an improved arrangement of a lens assembly and an image sensor, and the smear effect on the image plane of the improved imaging system in accordance with some embodiments of the present disclosure.
FIG. 5B is a side view illustrating the improved arrangement of the lens assembly and the image sensor in accordance with some embodiments of the present disclosure.

In operation and in accordance with some embodiments, the optical axis 350 of rectilinear lens assembly 310 can be pointed at nadir 355 while fixing field of view 305 at 20° ahead of the imaging platform (e.g., the ISS). Additionally, FPA 320 is positioned parallel to the object plane 505 (as shown in FIG. 5B) of rectilinear lens assembly 310. It should be noted that the forward looking angle of field of view 305 can be varied without departing from the scope of the disclosure. For example, field of view 305 can be placed 15° or 30° ahead of the imaging platform.

In general, a FPA has two main layers. The first layer is a low-band gap infrared sensitive layer made from materials such as mercury cadmium telluride (HgCdTe) and indium antimonide (InSb). In some embodiments, the first layer of FPA 320 can be made from HgCdTe, InSb, or other appropriate IR sensitive compounds (e.g., InGaAs and vanadium oxide). The second layer of an FPA is a readout integrated circuit (ROIC), which can be fabricated using CMOS. The first layer is then bonded to the second layer such that each readout unit of the ROIC corresponds to a single pixel on the first layer. The main function of an ROIC is to collect and store electrical charges (photocurrent) at each pixel of the first layer, which is readout at the end of each image acquisition (exposure) cycle.

In some embodiments, FPA 320 can have a full frame-transfer architecture where readout from the ROIC is done for the entire/full frame at a time. This allows every single pixel of FPA 320, during the motion compensation process, to continue to collect light from the same source on the object plane. Then at the end of the exposure, the entire frame is readout to an image processor.

In a stereoscopic application of some embodiments, a timed delay exposure of a second FPA can be achieved by flushing out its ROIC and at a time ($t_0$ plus $\Delta i$) after the start of a photocurrent acquisition cycle by the first or main FPA. Once flushed, the ROIC of the second FPA can reset and start to accumulate photocurrent at $t_0$ plus $\Delta i$. In this way, the resultant images generated by the main and secondary FPAs are time shifted, which can be associated with each other to create stereoscopic image pairs. One of the key advantages to this embodiment is that a stereoscopic image pair can be generated in a single image acquisition cycle. In the example of an aerial image taken from the ISS, stereoscopic data can be used to determine the altitude of various objects such as clouds, terrains, and man-made objects. Additional discussion of system's 300 stereoscopic capabilities and functionalities is provided below.

Current/conventional motion compensation systems can only compensate for the forward motion of the ISS by translating the image sensor in one direction. A two-dimensional (x-y directions) motion compensation is not contemplated by current FMC systems. In some embodiments, a motion compensation module (see FIG. 9 and related discussion below) of imaging system 300 is configured to perform motion compensation to compensate for both the forward motion 330 of the ISS and the rotational motion 340 of the Earth. Multiple full-frame motion of the image sensor (e.g., FPA 320) during a long exposure is now possible because image circle 315 is appropriately sized to allow a broad range relative motion of lens assembly 310 and FPA 320. For example, in some embodiments, image circle 315 is at least twice the size of FPA 320.

In some embodiments, FPA 320 is mounted such that it is parallel to the object plane of rectilinear lens assembly 315. Additionally, at the start of an image acquisition cycle, FPA 320 is positioned off nadir rather than being centered about nadir 355. In some embodiments, the center of FPA 320 can be positioned at nadir 355 at the start of an image acquisition cycle, but can be translated off nadir at the end of the image acquisition cycle. FPA 320 can be translated such that a portion of FPA 320 is off nadir (off centered with respect to optical axis 350). Alternatively, FA 320 can be translated such that it is entirely off nadir—no portion of FPA 320 aligns with optical axis 350. This enables system 300 to have a broad range of motion within image circle 315 for two-dimensional motion compensation. In some embodiments, at the start of an image acquisition cycle, lens assembly 310 is positioned such that optical axis 350 is at the center of FPA 320. During the image acquisition cycle, lens assembly 310 can translated such that FPA 320 is off centered with respect to optical axis 350. Further, lens assembly 310 can be translated such that the entire FPA 320 is off nadir.

In some embodiments, the motion compensation module can move rectilinear lens assembly 310 and/or FPA 320 in two dimensions to create relative motion therebetween based on the calculated motion vector of the ISS (the imaging platform). The motion vector of the ISS includes a first direction with a first velocity and a second direction with a second velocity. The motion compensation module creates a counter motion in a first dimension to compensate for the first direction and the first velocity, which can be the forward motion and velocity of the ISS and any forward component of rotational movement 340. The motion compensation module can also create a counter motion in a second dimension to compensate for non-forward component of rotational motion 340, which can be represented by the second direction and the second velocity. The magnitude of the second velocity of the second direction with respect to the first velocity of the first direction depends on the longitude and latitude of the ISS. For example, at certain longitude and latitude, the magnitude of the first direction can be 15 times larger than the magnitude of the second direction.

It should be noted that image circle 315 and FPA 320 are drawn to be outside of lens assembly 310 for illustrative purpose only and that lens assembly 310 (including its image plane 315 and focal plane) and FPA 320 are located within a camera unit affixed to the imaging platform.

Figure 4:
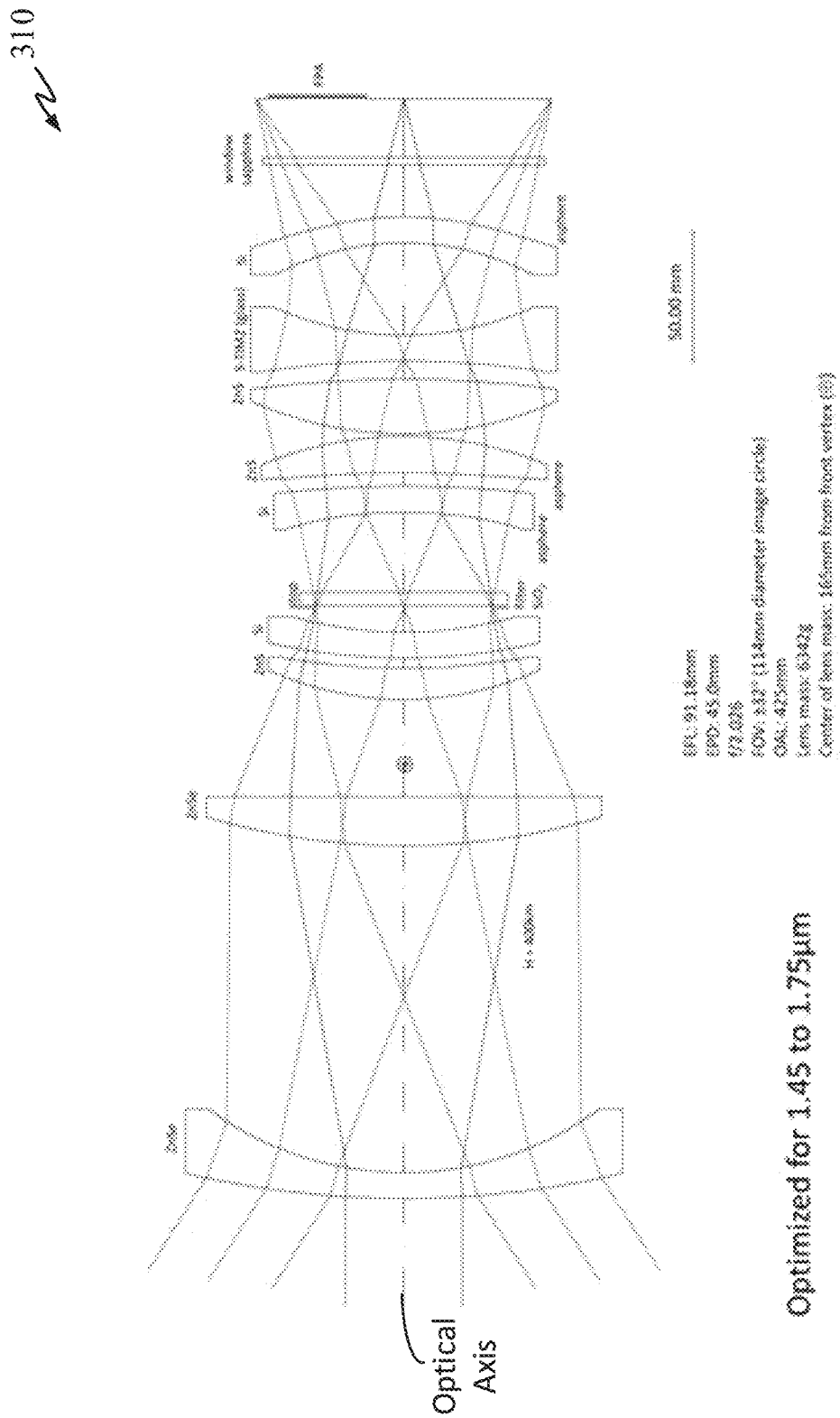
FIG. 4 illustrates an example rectilinear lens assembly in accordance with some embodiments of the present disclosure.

FIG. 4 illustrates rectilinear lens assembly 310 employed by system 300 in accordance with some embodiments of the present disclosure. Rectilinear lens assembly 310 enables straight line on the ground to appear as straight line in the focal plane rather than being curved. Stated differently, rectilinear lens assembly 310 renders straight lines in the object space as straight lines in the image space. It does not have any intrinsic (internal) distortion in that the image height in the focal plane is equal to an effective focal length (EFL)×the tangent of the angle in object space. Intrinsic distortion is equivalent to a change in effective focal length with field of view or position in the image. However, rectilinearity is a necessary but not sufficient condition for eliminating smear. The other condition is that the object and image planes be parallel.

Accordingly, in system 300, when rectilinear lens assembly 310 is used in combination of FPA 320 being parallel to its object plane, parallel lines on the ground are mapped to parallel lines of pixels in FPA 320, which thereby reduces or entirely eliminates pixel smearing caused by the railroad track optical effect. In some embodiments pertaining to infrared wavelengths, lens assembly 310 is composed of filters and lenses of varying types such as converging and diverging lenses with material compositions and properties as indicated in FIG. 4. In operation, the optical axis of rectilinear lens assembly 310 is pointed at nadir or at a point orthogonal to the object plane. In this way, the focal/image plane of lens assembly 310 is parallel to the object plane.

FIGS. 5A and 5B illustrate top and side views of the rectilinear lens assembly-FPA arrangement, respectively, in accordance with some embodiments of the present disclosure. FIG. 5A also illustrates the distortion and pixel smearing effect being highly mitigated by imaging system 300 as a result of: the application of the two-dimensional motion compensation methodology; the use of rectilinear lens assembly 310; and the parallel spatial arrangement between FPA 320 and the object plane of rectilinear lens assembly 310, while positioning optical axis 350 at nadir 355. For example, as shown in FIG. 5B, FPA 320 is parallel to object plane 505 of lens assembly 310, and optical axis 350 of lens assembly 310 is pointed at nadir 355.

Referring again to FIG. 5A, field of view 305 is defined by points A, B, C, and D on object plane 505. In some embodiments, field of view 305 has a forward looking angle of 20° (not shown) with respect to the ground swath area. At the start of an image acquisition cycle, at time to, a pixel 510 at corner C in FPA 320 can be mapped to an object point on the ground at location 510' shown in object plane 505. At time $t_{o+1}$, the relative position of the imaging platform has moved due to the orbital motion of the ISS and the rotation of the Earth. This results in the same object on the ground (at location 510') being moved in one or more of the x and y directions in the focal plane 320. In an ideal motion compensation system, the same object at time $t_{o+1}$ should map to the same pixel 510 at C in FPA 320. However, due to the curvature of the Earth, there can be some minute amount of pixel smear at the corners of field of view 305. For example, the same object on the ground at location 510', at time $t_{o+1}$, is now at location 515 on object plane 505. The distance difference between locations 510' and 515, as measured in pixels in FPA 320, is 1.9 pixels. At FPA corners B, A, and D, the total amount of pixel smear for each corner is 1.9, 0.7, and 0.7 pixels, respectively. Additionally, there is zero pixel smear at the center of FPA 320.

Figure 6:
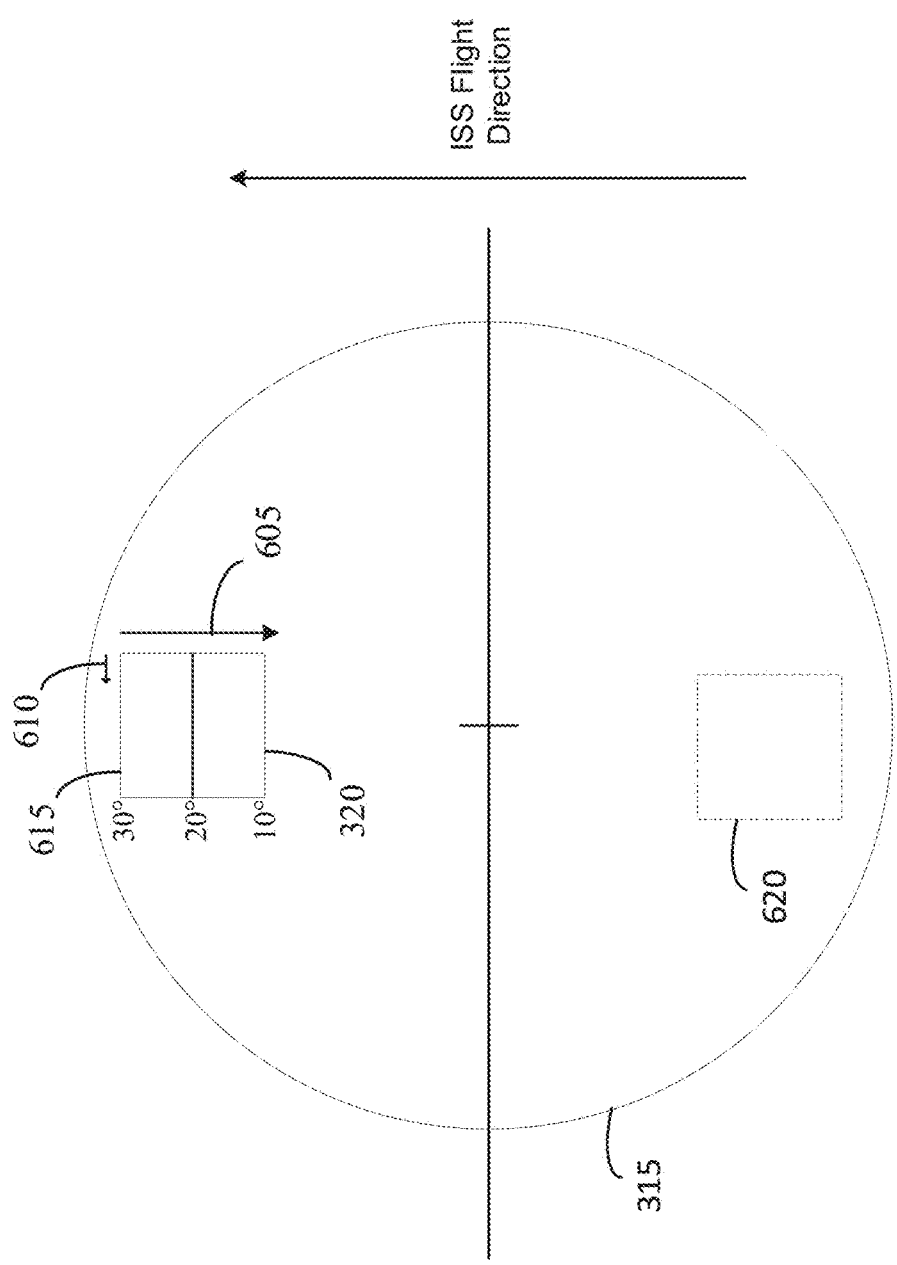
FIG. 6 is a top view illustrating the spatial arrangement of the image circle and the image sensor in accordance with some embodiments of the present disclosure.

FIG. 6 is a top view illustrating the location of FPA 320 with respect to image circle 315 in accordance with some embodiments of the present disclosure. As previously mentioned, image circle 315 can be at least 1.5 larger than the size of FPA 320. In some embodiments, image circle 315 is sized such that there is sufficient room to have multiple full-frame translation of FPA 320 within image circle 315 while keeping all pixels of FPA 320 pointed to the same locations on the ground (object plane 505) during a long image acquisition cycle. For example, at the start and end of an image acquisition cycle, the entire frame of FPA 320 can be translated from position 615 to position 620. In some embodiments, image circle 315 can be sufficient sized to enable FPA 320 to partially or fully move to any quadrant of image circle 315.

In some embodiments, the motion compensation module can cause relative motion between lens assembly 310 and FPA 320 by moving only lens assembly 310, only FPA 320, or a combination of both. The direction and magnitude of the relative motion depends on the motion vector of the moving image scene or objects on the ground (at object plane 505). Based on the motion vector of the image scene, a counter motion vector is determined to cancel out the image scene motion vector. The counter motion vector has two vector components 605 and 610 as shown in FIG. 6. The first vector component 605 has a direction parallel and opposite to the ISS's flight direction and a magnitude equal to the summation of the velocity of the ISS with respect to the Earth and any velocity component from the Earth's rotation in the ISS' flight direction. The second vector component 610 has a direction perpendicular to the ISS's flight direction, which is a component of the Earth's rotation. The magnitude of vector component 610 depends on the location (i.e., longitude and latitude) of the ISS. It is, however, typically much less than the magnitude of the first vector component 605. In some embodiments, the forward motion of the ISS and the Earth's rotation can be compensated by generating relative motion between lens assembly 310 and FPA 320 based on the determined counter motion vector, which has the same magnitude and opposite in direction as the image scene motion vector.

In some embodiments, at the start of an image acquisition cycle, FPA 320 can be located at 615 near the edge of image circle 315—completely off nadir 355 (as shown in FIG. 6). During an image acquisition (exposure) cycle, FPA 320 and lens assembly 310 can be translated with respect to each other in two dimensions in accordance with counter vector components 605 and 610. In some embodiments, at the end of the image acquisition cycle, FPA 320 can be located anywhere within the image circle 315. For example, FPA 320 can be at location 620 at the end of the image acquisition cycle. In some embodiments, at the start of an image acquisition cycle, FPA 320 can be centered about nadir 355 and can be translated to an off nadir position during the image acquisition cycle. In this way, each of the pixels of FPA 320 can stay focused on the same position/object on the ground during the entire exposure period. Additionally, because FPA 320 is parallel to object plane 505, parallel lines in the image scene (object plane 505) are properly tracked to parallel pixels on FPA 320 and thereby substantially eliminating pixel smears, notably at the corners of the image scene.

Stereoscopic Features and Functionalities

Figure 7A:
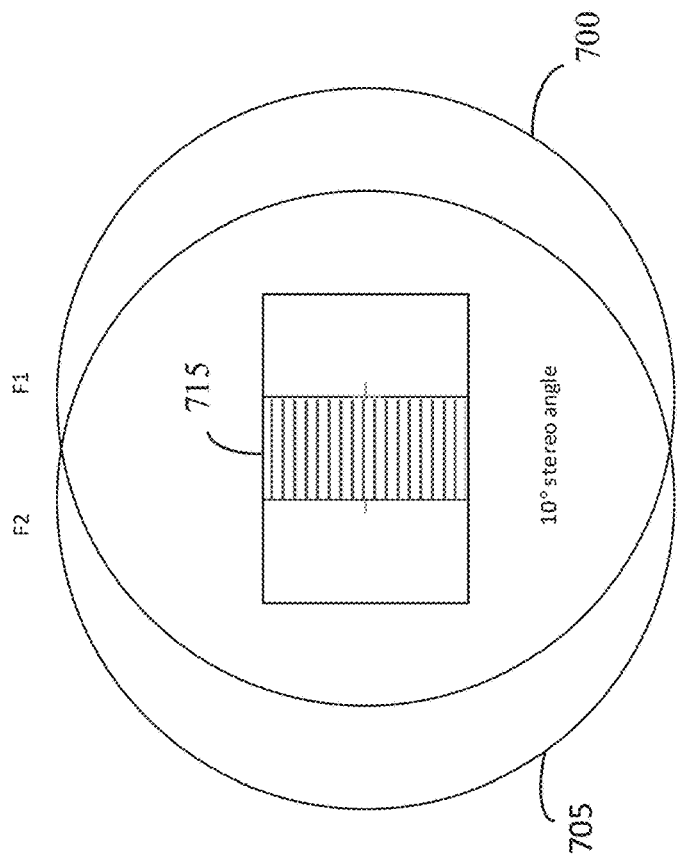
FIG. 7A is a diagram illustrating a method of using successive frames to generate stereoscopic images in accordance with some embodiments of the present disclosure.
Figure 7A:
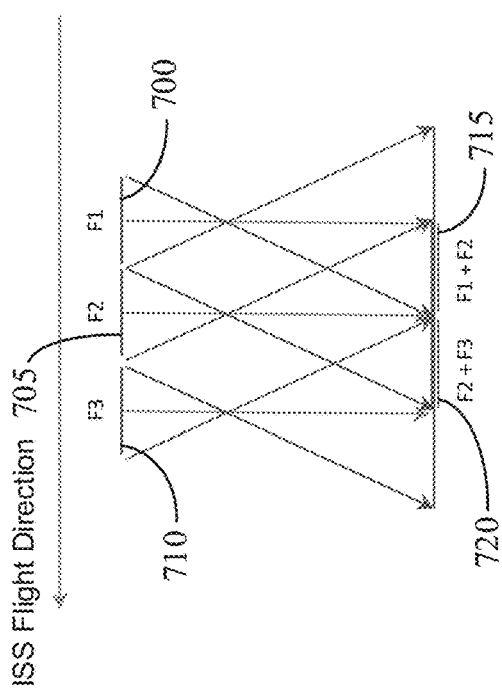

FIG. 7A is a diagram illustrating how images from sequential frames of a single FPA 320 can be used to generate stereoscopic image pairs in accordance with some embodiments of the present disclosure. To illustrate the stereometric geometry more clearly in a side view, the ISS flight direction has been rotated 90 degrees with respect to FIG. 6. In system 300 (as shown in FIG. 3), each successive 20° frame has a 10° overlapping area with a preceding frame. For example, frames 700 and 705 have an overlapping area of 10° in their respective field of view. Since images of the 10° overlapping area from frames 700 and 705 are time and position shifted, they can form a stereoscopic image pair 715. Similarly, images from frames 705 and 710 also form a stereoscopic image pair 720. Further, images from frame 710 and its succeeding frame can also be used to generate a stereoscopic pair, and so on. In this way, as the ISS moves, system 300 can continuously generate stereoscopic images. This stereoscopic pair, can be used to calculate the altitude of various objects such as clouds, other atmospheric features, and man-made objects.

Figure 7B:
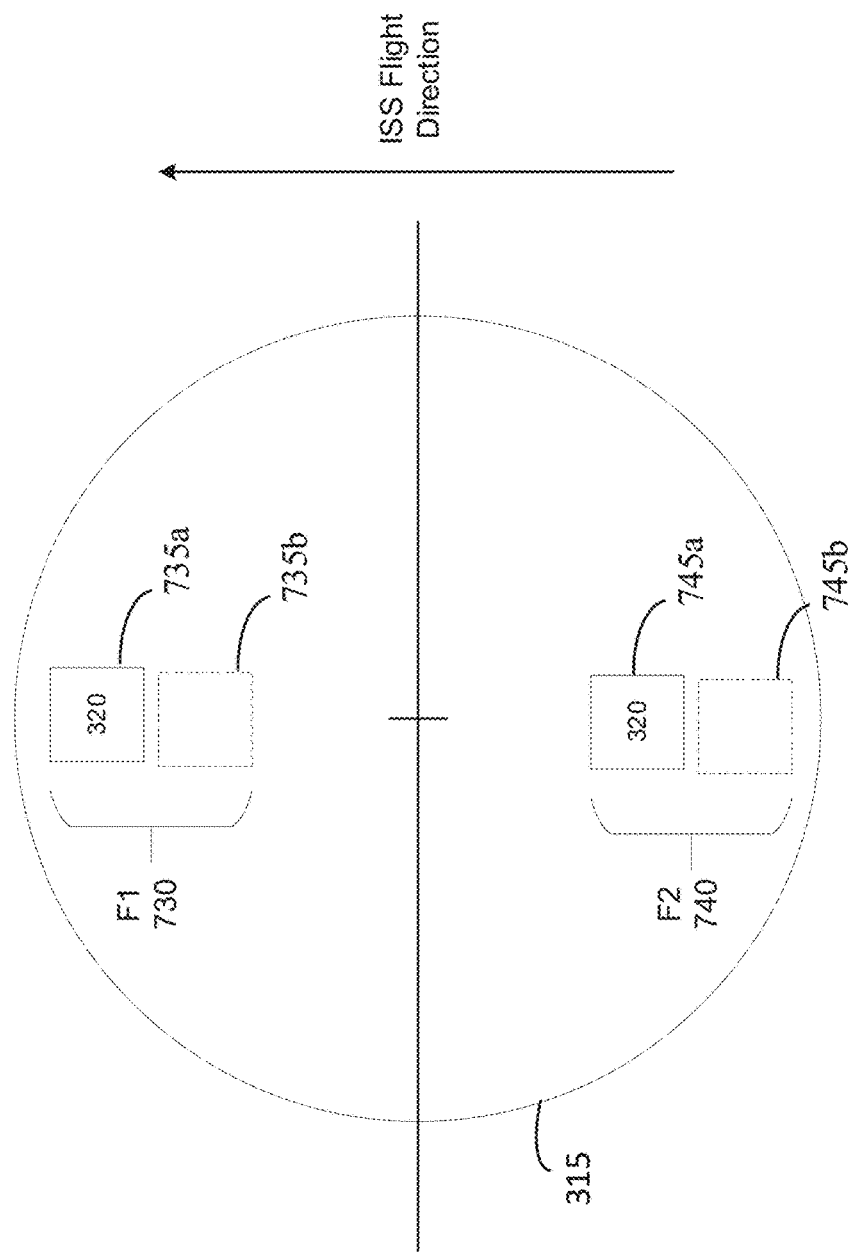
FIG. 7B is a top view illustrating the spatial arrangement of the image circle and the two image sensors in accordance with some embodiments of the present disclosure.

FIG. 7B is a top view illustrating the locations of FPA 320 in a process for generating stereoscopic image pairs during two consecutive image acquisition cycles, in accordance with some embodiments of the present disclosure. At the start of the first image acquisition cycle 730, FPA 320 is at location 735a. During the motion compensation process, FPA 320 is moved to a second location 735b at the end of the first image acquisition cycle 730. Once the first image acquisition cycle is over, FPA 320 can be rapidly moved to a third position 745a prior to the start of the second image acquisition process 740. In some embodiments, rapidly moving FPA 320 is moving FPA 320 faster than FPA 320 would normally move during the motion compensation process. In other words, FPA 320 is moved faster than the scene to be imaged in the object plane. In this way, prior to the start of the second image acquisition process, FPA 320 is positioned to capture the same scene in the object plane but at a different angle. In some embodiments, location 735a is near the edge of image circle 315 and where image vignetting is minimal or absent. Similarly, location 745b is near a second opposing edge of image circle 315 (where image vignetting is minimal or absent). This stereoscopic pair, can be used to calculate the altitude of various objects such as clouds, other atmospheric features, and man-made objects.

Figure 8A:
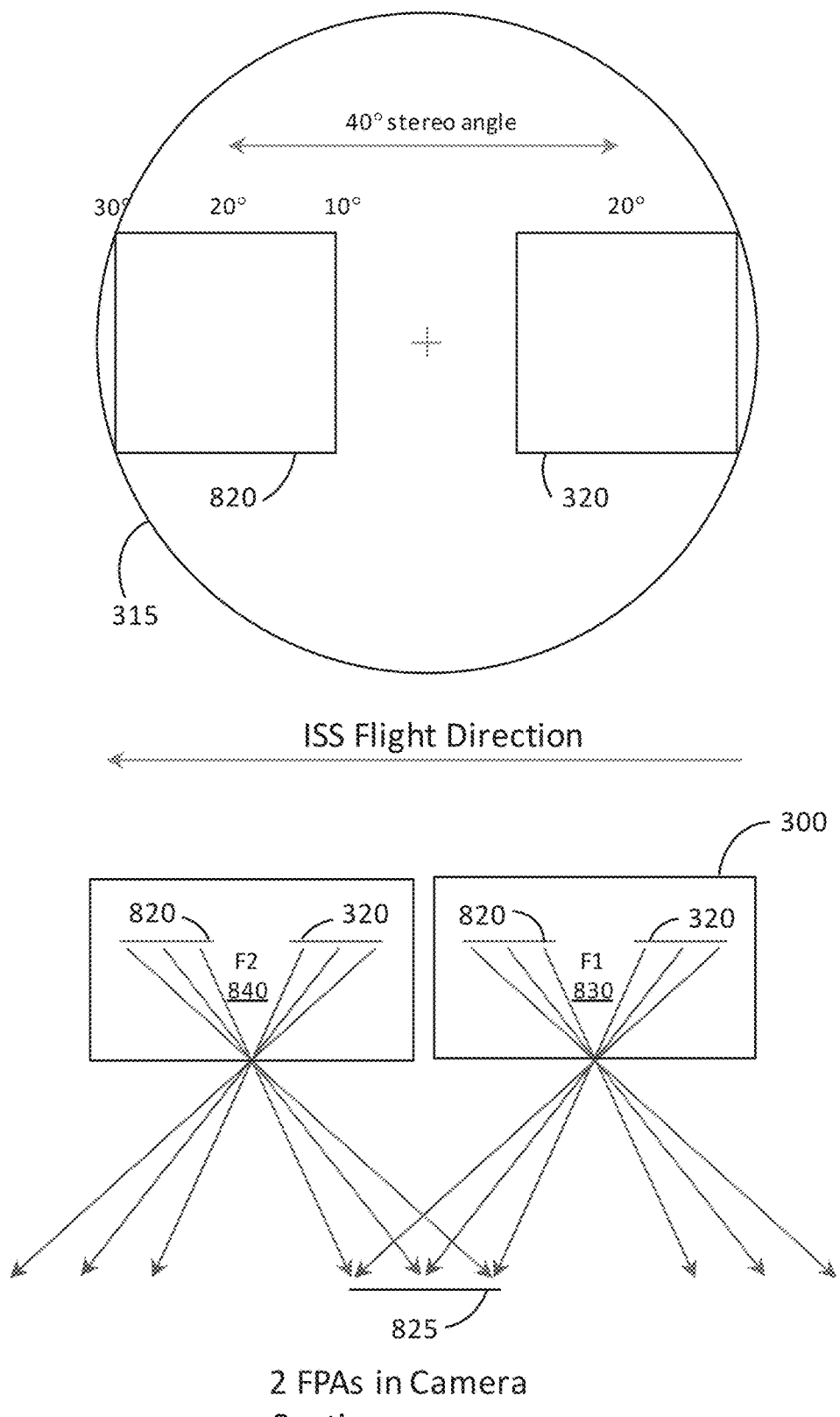
FIG. 8A is a diagram illustrating a method of using successive frames to generate stereoscopic images in accordance with some embodiments of the present disclosure.

FIG. 8A is a diagram illustrating how system 300 can generate stereoscopic image pairs using two FPAs 320 and 820 in accordance with some embodiments of the present disclosure. In some embodiments, both FPAs 320 and 820 are located along the flight direction of the ISS and are parallel to the object plane. Note that to illustrate the stereometric geometry more clearly in side view, the ISS flight direction is rotated 90 degrees compared to FIGS. 6 and 7B. During an initial image acquisition cycle (F1 830), FPA 320 records an image of an object scene 825 at a forward look angle, for example 20 degrees. The forward look angle can be any angle such that the FPA 320 lies completely within the image circle 315. During a later image acquisition cycle (F2 840), the other FPA 820 records an image of the same object scene 825 at a rearward look angle. The rearward look angle can be any angle such that the FPA 820 lies within the image circle 315. The two images of scene 825 recorded by the two FPAs from different look angles then constitute a stereo pair that can be used to determine vertical relief in the scene. This sequence can be repeated indefinitely as the system 300 advances over the scene creating continuous stereo coverage in successive scenes 825 using the full fields of view of each FPA. This stereoscopic pair, can be used to calculate the altitude of various objects such as clouds, other atmospheric features, and man-made objects.

Figure 8B:
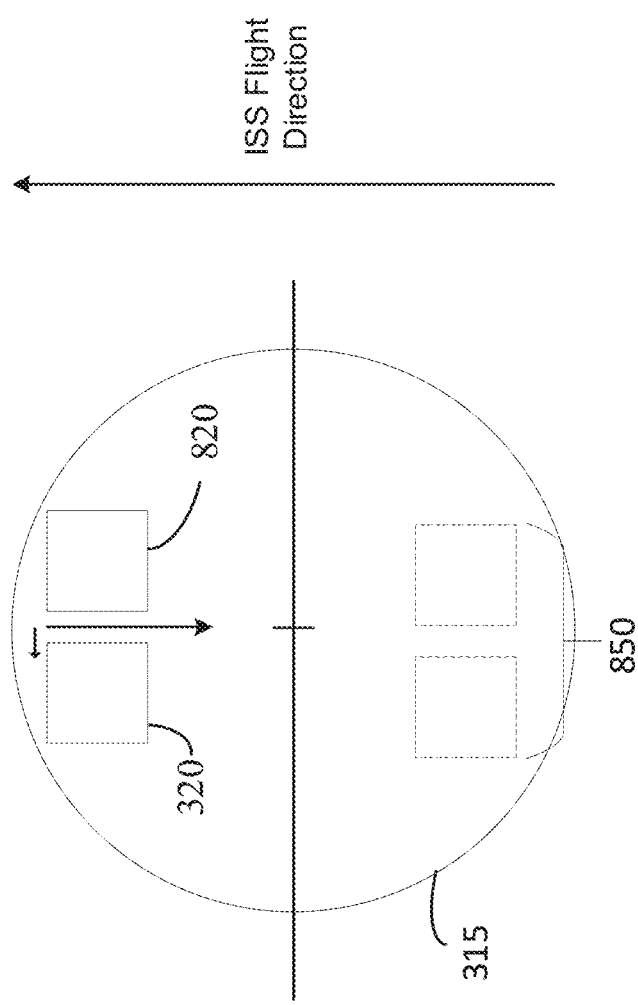
FIG. 8B is a top view illustrating the spatial arrangement of the image circle and the two image sensors in accordance with some embodiments of the present disclosure.

FIG. 8B is a top view illustrating an alternative arrangement of FPAs with respect to image circle 315 in accordance with some embodiments of the present disclosure. In some embodiments, FPAs 320 and 820 are arranged such that their common axis is perpendicular to the path of motion. In this embodiment, the coverage area (ground cross-track swath width) of the resulting stereoscopic image pairs as described in FIGS. 7A and 7B can be effectively doubled. FPA 320 forms a stereo pair as described in FIG. 7A or FIG. 7B and 820 also forms an independent stereo pair as described in FIG. 7A or FIG. 7B. The stereo pairs formed by 320 and 820 will be adjacent in a direction perpendicular to the path of motion. These stereoscopic pairs, can be used to calculate the altitude of various objects such as clouds, other atmospheric features, and man-made objects.

In some embodiments, FPA 820 can include an integrated aperture layer onto top of the IR sensitive layer. The integrated aperture layer can include a dedicated aperture for each pixel on the IR sensitive layer. At the start of the image acquisition cycle when FPA 320 is exposed, the integrated aperture layer of FPA 820 can remain closed and is time delayed by Δi before all apertures of the aperture layer are opened. In this way, the image generated by FPA 820 is time and position shifted with respect to the image generated by FPA 320.

In some embodiments, the ROIC of FPA 820 can be configured to be inactive (photocurrent is not stored) for a short period at the start of each image acquisition cycle. In this way, a photocurrent flushing procedure may not be required.

It should be noted that where FPAs 320 and 820 are being translated, the translation motion can be accomplished by moving only each FPA (or a pair of FPAs as a unit) while fixing lens assembly 310 in place. Alternatively, lens assembly 310 (shown in FIG. 3) can be moved while each FPA is fixed in place. Still further, lens assembly and each of the FPAs can be translated simultaneously to generate relative motion therebetween.

Imaging System

Figure 9:
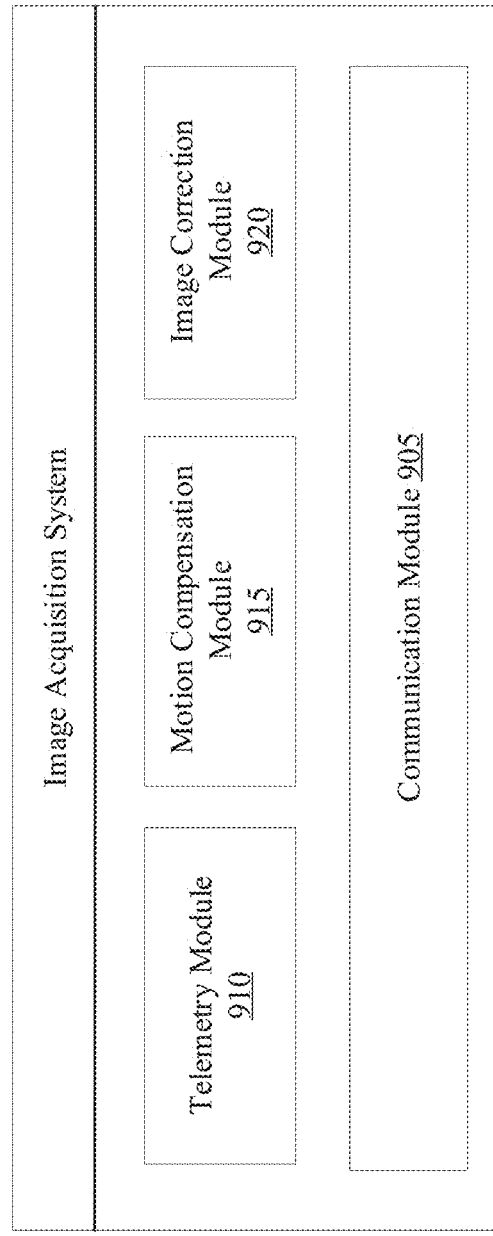
FIG. 9 is a block diagram illustrating an example imaging system module in accordance with some embodiments of the disclosure.

FIG. 9 is a block diagram illustrating an imaging acquisition system 900 in accordance with some embodiments of the present disclosure. Imaging acquisition system 900 includes a communication module 905, a telemetry module 910, a motion compensation module 915, and an optional image correction module 920. Communication module 905 includes communication interfaces that enable a user to control system 900 from the ISS or from an earth-based station. Communication module 905 can also include transceiver for transmitting data collected to the earth-based station. Telemetry module 910 can determine the speed and position (e.g., longitude and latitude) and attitude of the ISS with respect to the Earth. Telemetry module 910 can also determine the motion vector of the image scene by taking into account the orbital speed of the ISS and the Earth's rotation. Based on the determined motion vector of the image scene, motion compensation module 915 can produce relative motion between lens assembly 310 and FPA 320 (or the FPAs 320 and 820 pair of FIG. 8A, or the FPAs 320 and 820 pair of FIG. 8A). Motion compensation module 915 can produce relative motion by moving lens assembly 310, FPA 320, or a combination of both. In some embodiments, only lens assembly 310 is moved to create relative motion between lens assembly 310 and FPA 320.

It should be noted that telemetry module 910 and motion compensation module 915 can have overlapping functionalities. For example, motion compensation module 915 can use telemetry data from telemetry module 910 to calculate the counter motion vector. Telemetry module 910 and motion compensation module 915 can also be combined into a single module.

Although the images generated by system 900 are substantially smear free, image correction module 920 can apply image correction algorithms to completely eliminate any minute amount of pixel smearing at the edges of the image caused by the curvature of the Earth.

Figure 10:
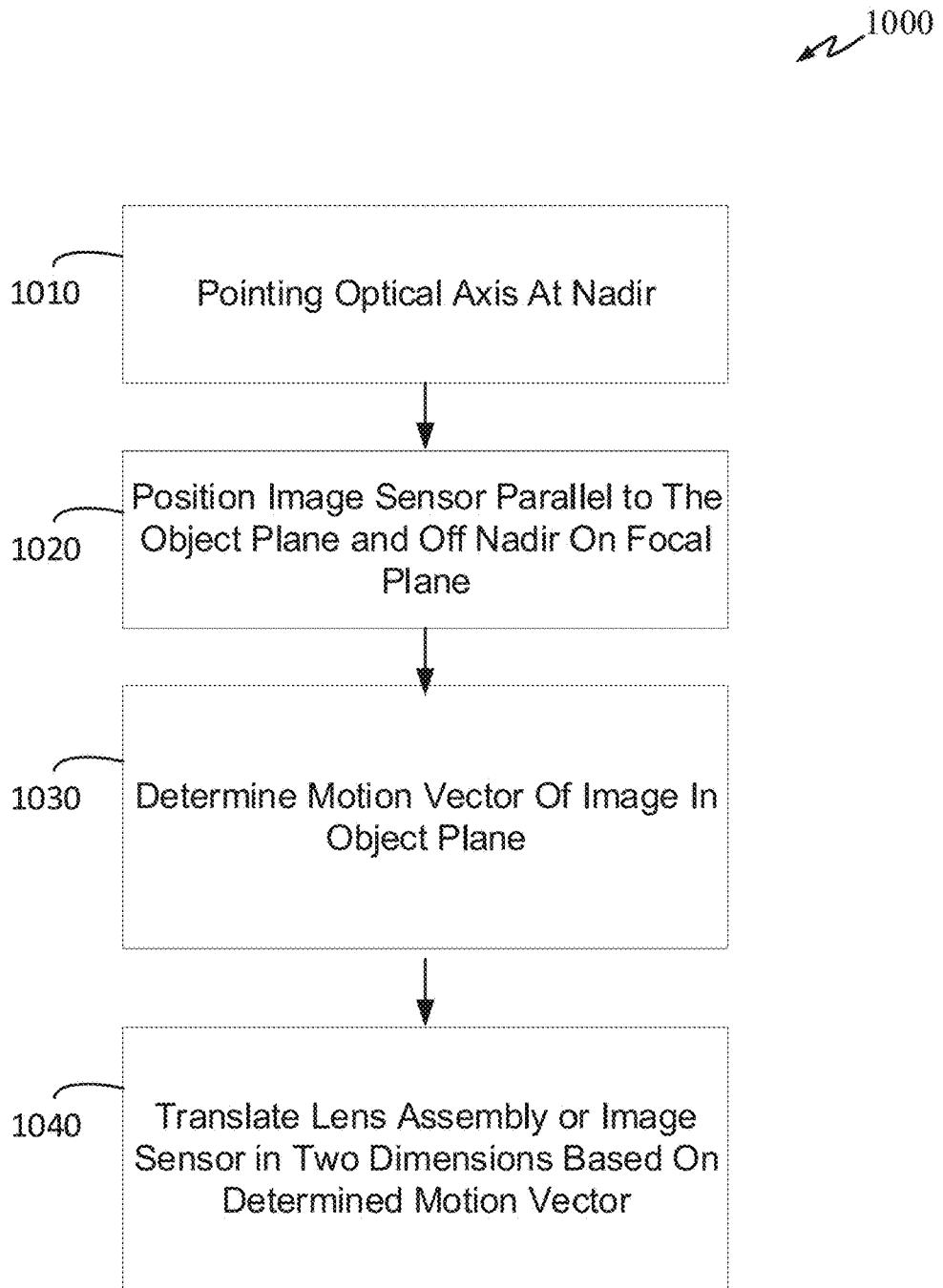
FIG. 10 is a block diagram illustrating a process for motion compensation in accordance with some embodiments of the disclosure.

FIG. 10 is a flow chart of a method 1000 for compensating the motion of an image scene (or a moving platform) in an imaging capturing system. Method 1000 starts at 1010 where the optical axis of a rectilinear lens assembly (e.g., lens assembly 310) of the imaging capturing system is pointed at nadir (e.g., system 300). In conventional image capturing technologies, the optical axis of the camera lens is at an angle with respect to the object plane. In method 1000, during the image acquisition process, the optical axis of the imaging capturing system is pointed to a location on the object plane such that it is orthogonal to the object plane. On an aircraft or an orbital platform, that location is the nadir point. In other applications such as a ground-based camera, the optical axis is pointed at a location perpendicular to the object plane.

At 1020, at the start of the image acquisition process, the image sensor (e.g., FPA 320) is positioned parallel to the object plane and off nadir. In other words, the image sensor is initially off centered in the image circle (e.g., image circle 315) of the rectilinear lens assembly (e.g., lens assembly 310). In this way, there is a sufficient amount of room for the image sensor to move about the image circle during the motion compensation process. At 1030, the motion vector of the image scene on the object plane is determined. This can be done by telemetry module 910 or by motion compensation module 915. The motion vector of the image scene has two dimensional components. The first component is in the direction of forward motion of the imaging platform (e.g., the ISS) and contributing component (in the forward direction) from the Earth's rotation. The second component is orthogonal to the first component and is from the rotation of the Earth At 1040, the lens assembly and the image sensor are translated with respect to each other in two-dimensions based on the determined image scene motion vector. The vector of translation is directly opposite in magnitude and direction with the image scene motion vector.

Figure 11:
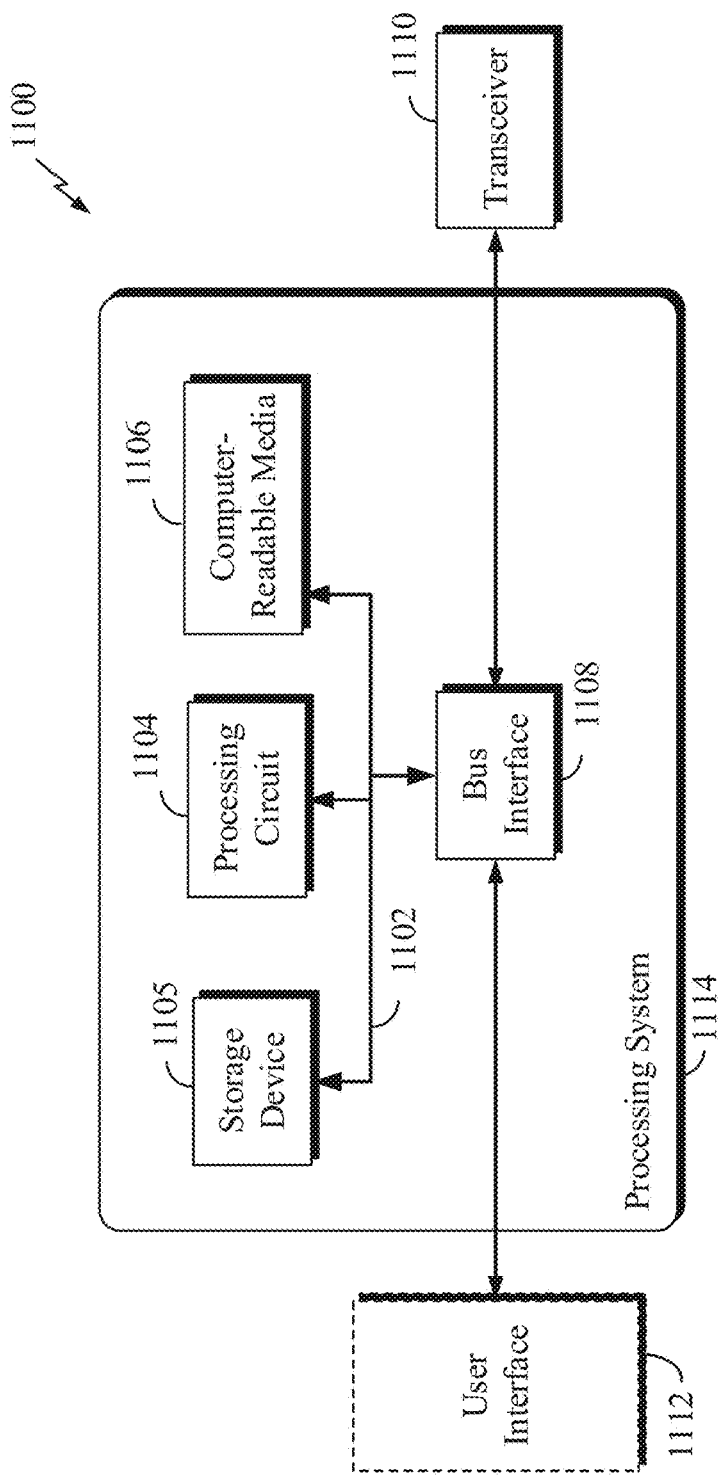
FIG. 11 is a block diagram illustrating an example of a hardware implementation for the system in FIG. 9 and the process in FIG. 10.

FIG. 11 illustrates an overall system or apparatus 1100 in which systems 300 and 900, and method 1000 can be implemented. In accordance with various aspects of the disclosure, an element, or any portion of an element, or any combination of elements may be implemented with a processing system 1114 that includes one or more processing circuits 1104. Processing circuits 1104 may include microprocessing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 1104 may be used to implement any one or more of the processes described above and illustrated in FIG. 10.

In the example of FIG. 11, processing system 1114 can be implemented with a bus architecture, represented generally by a bus 1102. Bus 1102 can include any number of interconnecting buses and bridges depending on the specific application of the processing system 1114 and the overall design constraints. Bus 1102 can link various circuits including one or more processing circuits (represented generally by the processing circuit 1104), a storage device 1105, and a machine-readable, processor-readable, processing circuit-readable or computer-readable media 1106. Bus interface 1108 can provide an interface between bus 1102 and a transceiver 1110, which provides a means for communicating with various other apparatus over a transmission medium. Depending upon the nature of the apparatus, a user interface 1112 may also be provided.

The processing circuit 1104 is responsible for managing bus 1102 and for general processing, including the execution of software stored on storage device 1105 or on a computer-readable medium. The software, when executed by processing circuit 1104, causes processing system 1114 to perform the various functions described herein for any particular apparatus.

One or more processing circuits 1104 in the processing system may execute software or software components such as one or more portions of communication module 905, telemetry module 910, motion compensation module 915, and image correction module 920 (as shown in FIG. 9). Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

One or more of the components, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Note that the aspects of the present disclosure may be described herein as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

As used herein and in the appended claims, the singular forms "a," "an," and "the" include plural referents unless the context clearly dictates otherwise.

The examples and embodiments provided herein are provided for illustrative purposes and are not intended to limit the application or claims provided herein. It will be understood that the specific embodiments disclosed herein and the systems, components, methods, modules, etc. described herein need not take the specific form described, but can instead be applied in various different or additional manners consistent with the present disclosure and claims. It will further be understood that the present disclosure need not take the specific form explicitly described herein, and the present disclosure is intended to include changes variations thereof, consistent with the appended claims and the present disclosure, for example, to optimize the subject matter described herein. The disclosed subject matter is not limited to any single or specific embodiment described herein, but rather should be construed in breadth and scope in accordance with the appended claims.

The invention claimed is:

1. An imaging system comprising:
   a rectilinear lens assembly having an optical axis, an image plane, and an image circle located on the image plane;
   a first 2D-image sensor located on the image plane and being parallel to an object plane, wherein the rectilinear lens assembly is positioned such that the optical axis is orthogonal to the object plane during an imaging acquisition process, wherein the image circle is larger than a size of the first 2D-image sensor; and
   a motion compensation module configured to:
      determine a motion vector of an image scene in the object plane; and
      in response to the determined motion vector, translate the rectilinear lens assembly and the first 2D-image sensor relative to each other in two dimensions.

2. The imaging system of claim 1, wherein the first 2D-image sensor is positioned within the image circle of the rectilinear lens assembly such that it is entirely offset from the optical axis at a start of an image acquisition cycle.

3. The imaging system of claim 1, wherein the first 2D-image sensor is positioned within the image circle of the rectilinear lens assembly such that it is centered at the optical axis at a start of an image acquisition cycle.

4. The imaging system of claim 3, wherein the relative motion of the rectilinear lens assembly and the first 2D-image sensor can cause the first 2D-image sensor to be entirely offset from the optical axis.

5. The imaging system of claim 1, wherein the motion compensation module is configured to move the rectilinear lens assembly with respect to the first 2D-image sensor.

6. The imaging system of claim 1, wherein the motion compensation module is configured to move the first 2D-image sensor with respect to the rectilinear lens assembly.

7. The imaging system of claim 1, further comprises:
   a second 2D-image sensor located on the image plane near the first 2D-image sensor and parallel to the object plane, wherein the first and second 2D-image sensors are configured to view a same portion of the object plane, wherein the second 2D-image sensor is exposed at a later time from a different angle due to motion of the moving platform, and wherein images generated from the first and second 2D-image sensors form a stereoscopic image pair.

8. The imaging system of claim 7, wherein the first and second 2D-image sensors comprise infrared focal plane arrays.

9. The imaging system of claim 7, wherein the second 2D-image sensor comprises an integrated aperture for each detector unit of the second 2D-image sensor, wherein the integrated aperture is configured to expose the second 2D-image sensor to electromagnetic radiation after the first 2D-image sensor is exposed, wherein both the first and second 2D-image sensors are inside of the image circle of the rectilinear lens assembly at a start of each image acquisition cycle.

10. The imaging system of claim 1, wherein the image circle of the rectilinear lens assembly is sized to allow multiple full-frame translation of the first 2D-image sensor within the image circle.

11. A method for motion compensation in an imaging system, the method comprising:
   positioning a rectilinear lens assembly such that an optical axis of the rectilinear lens assembly is at nadir;
   positioning a first 2D-image sensor on a focal plane of the rectilinear lens assembly and parallel to an object plane, wherein the first 2D-image sensor is positioned such that a center of the first 2D-image sensor is off nadir;
   determining a motion vector of the image in the object plane; and
   translating, in two dimensions on the focal plane, the rectilinear lens assembly and the first 2D-image sensor with respect to each other based on the determined motion vector of the image.

12. The method of claim 11, wherein translating the rectilinear lens assembly and the first 2D-image sensor with respect to each other comprises translating the rectilinear lens assembly.

13. The method of claim 11, wherein translating the rectilinear lens assembly and the first 2D-image sensor with respect to each other comprises translating the first 2D-image sensor.

14. The method of claim 11, further comprises creating a stereoscopic image pair from images generated by the first 2D-image sensor in different image acquisition cycles, wherein the stereoscopic image pair comprises a first and a second images generated during a first and a second image acquisition cycles, respectively.

15. The method of claim 14, wherein the first 2D-image sensor is located near a first edge of the image circle during the first image acquisition cycle, and near a second edge of the image circle during the second image acquisition cycle.

16. The method of claim 15, wherein the first 2D-image sensor is rapidly moved from the first edge to the second edge of the image circle after the first image acquisition cycle and prior to the second image acquisition cycle.

17. The method of claim 11, further comprises:
   positioning a second 2D-image sensor on the focal plane near the first 2D-image sensor and parallel to the object plane, wherein the first and second 2D-image sensors have a common axis parallel to a direction of motion of a platform of the imaging system;
   exposing the first and second 2D-image sensors to electromagnetic radiation at a same time; and
   creating a stereoscopic image pair from images generated in different image acquisition cycles, wherein the stereoscopic image pair comprises a first and a second images generated by the first and second 2D-image sensors, respectively.

18. The method of claim 11, further comprises:

positioning a second 2D-image sensor on the focal plane near the first 2D-image sensor and parallel to the object plane, wherein the first and second 2D-image sensors have a common axis parallel to a direction of motion of a platform of the imaging system;

exposing the second 2D-image sensor to electromagnetic radiation after exposing the first 2D-image sensor; and creating a stereoscopic image pair from images generated by the first and second 2D-image sensors.

19. The method of claim 17, wherein the first and second 2D-image sensors are infrared focal plane arrays.

20. The method of claim 17, further comprises:

positioning the first and second 2D-image sensors on the image plane of the rectilinear lens assembly at a start of an image acquisition cycle, wherein the image plane is parallel to the object plane, and wherein the first and second 2D-image sensors have a common axis perpendicular to a direction of motion of a platform of the imaging system; and exposing the second 2D-image sensor, using an integrated aperture on the second 2D-image sensor, after the first 2D-image sensor is exposed.

* * * * *